Figure 1:
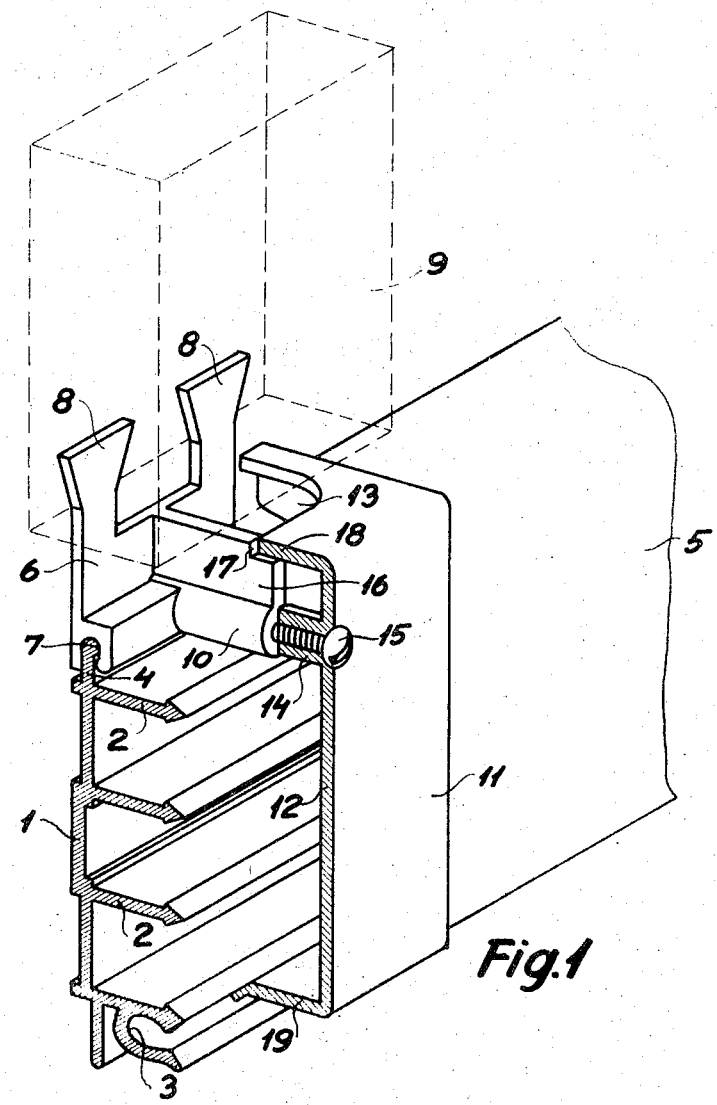

United States Patent [19]
Jensen et al.

[11] 3,844,078
[45] Oct. 29, 1974

[54] COUPLING ARRANGEMENT FOR CONNECTING AN INSULATING HOUSING ENCLOSING AN ELECTRIC DEVICE TO AN INSTALLATION PANEL DUCT

[76] Inventors: Borge Jensen, Ourgade 42; Aksel Fischer, Hojdevej 52, both of DK-2100 Copenhagen; Rolf Christian Luja Falck, Sonderholt Sorup, DK-3480 Fredensborg, all of Denmark

[22] Filed: Oct. 24, 1972

[21] Appl. No.: 300,016

[30] Foreign Application Priority Data
Oct. 25, 1971 Denmark............................ 5162/71
Oct. 29, 1971 Denmark............................ 5292/71

[52] U.S. Cl. ................................................ 52/221
[51] Int. Cl. ........................ H02g 3/08, E04f 17/08
[58] Field of Search ............................. 52/220, 221

[56] References Cited
UNITED STATES PATENTS
| | | | |
|---|---|---|---|
| 1,795,062 | 3/1931 | Warner | 52/221 |
| 1,906,670 | 5/1933 | Thomas | 52/221 |
| 1,981,239 | 11/1934 | Manske | 52/221 X |
| 2,107,915 | 2/1938 | Tashjian | 52/221 X |
| 3,551,584 | 12/1970 | Rose | 52/221 X |

FOREIGN PATENTS OR APPLICATIONS
415,009  12/1966  Switzerland.......................... 52/221

*Primary Examiner*—Werner H. Schroeder
*Attorney, Agent, or Firm*—Ladus, Parry, Von Gehr, Goldsmith & Deschamps

[57] ABSTRACT

This invention relates to an improved installation panel duct adapted to contain electric wires for power current as well as for low voltage communication, the panel duct consisting of an elongated base member and an elongated cover member adapted to be secured to said base member by means of a snap-fit connection, the arrangement of a coupling device for connecting an insulating housing for an electric device such as a switch or an outlet socket to the panel duct in alignment with an opening in the cover member, said coupling device comprising a primary and a secondary coupling member, said primary coupling member having means for snap-fit connection with the base member and means for attachment to said insulating housing, the secondary coupling member consisting of a cover plate for covering said opening in the elongated cover member and being provided with means for detachable connection with the primary coupling member and means for snap-fit connection with the base member.

6 Claims, 3 Drawing Figures

COUPLING ARRANGEMENT FOR CONNECTING AN INSULATING HOUSING ENCLOSING AN ELECTRIC DEVICE TO AN INSTALLATION PANEL DUCT

This invention relates to a coupling arrangement of the type applied for connecting an insulating housing enclosing an electric device such as a switch or socket outlet to an installation panel duct provided with electric wires and comprising a base member and secured thereto a cover panel. It is the object of the invention to provide a particularly simple coupling arrangement that requires a minimum of tools and a minimum of manipulation with the panel structure for connecting electric means such as switches and socket outlets etc. and whereby connection can be established at any desired point of the panel. Another object of the invention is to provide a coupling device which enables power current and low current installations to be enclosed in the same panel and independently of one another. This has been accomplished according to the invention by a coupling arrangement which comprises a coupling element adapted to cover an opening in the cover panel and provided with means for releasable connection to the base member and to the said insulating housing.

When employing a coupling arrangement like this it will, for instance, be possible to introduce a socket outlet by simply removing or leaving out a suitable section of the cover panel so that the coupling element will cover the front of the panel duct. To further facilitate the mounting of such a panel duct the coupling arrangement according to the invention may have a coupling element comprising a primary and a secondary coupling member, of which the primary coupling member is provided with means for coupling to the duct and to the insulating housing while the secondary coupling member is a cover plate with means for releasable connection to the duct and to the primary coupling member.

The primary member of the coupling element can be mounted directly at the upper edge of the panel duct and coupled thereto and to the insulating housing, whereafter the secondary member of the coupling element can be connected to the panel duct at the lower edge thereof and to the primary coupling member, for instance by means of a simple screw connection. The insulating housing of the electric device is connected to the primary coupling member simultaneously with the connection thereof to the panel duct and screwed in conventional manner to the wall on which the panel duct is mounted, on which the wires are connected and positioned, the mechanical installation of the said electric device is made and the secondary member of the coupling element is connected so that its cover plate covers up the opening in the cover panel.

In a preferred embodiment of the coupling arrangement the cover plate of the secondary coupling member is provided with edge flanges extending inwardly to the front of the cover panel and with a wall member facing the insulating housing of the electric device and provided with an opening. The said wall member is supported on the primary coupling member, and in this construction there will be ample space for wiring and at the same time effective covering of the opening in the cover panel.

The connection between the primary coupling member and the insulating housing of the electric device may be provided in any convenient manner, for instance by means of a frame member formed integral with the primary member and gripping the insulating housing, but in a particularly expedient embodiment of the coupling arrangement according to the invention the means for connecting the primary coupling member to the insulating housing of the electric device consists of at least one web adapted to be engaged in the lead-in opening for the wires of the electric device, which ensures an easy and rapid connection because it uses the openings in the housing which are provided already for leading in the wires. In another embodiment of the invention the said webs are dovetailed and constitute a very expedient utilization of the construction of an insulating housing for conventional switches and socket outlets.

In new installations it is often desirable to establish several points of connection in the panel duct, and it will then be sufficient to mount the primary and the secondary coupling member. In that case it will be expedient to design the arrangement so that the opening in the wall of the secondary coupling member is defined by an inwardly extending edge flange for cooperation with a slot in a cover member. Socket outlets or switches may then be placed at discretion, and at points where such electric means are not needed at the moment the said cover member may be applied to cover up the point of connection, and whenever it is wanted the cover may be detached and an electric means such as a socket outlet may be mounted.

Reversely, an existing socket outlet at a point where it is no longer wanted may be removed and the cover member applied to cover up the opening.

The cover panel will often be secured to the base member of the panel duct by means of a snap catch connection at the upper and lower edges of the base member, and then it will be expedient according to the invention to connect the coupling element, that is the two members thereof, to the base member by a snap catch connection matching the snap catch members of the base member of the panel duct.

To ensure that it will not be possible to touch the electric wiring with a knife or similar thin instrument where the wires pass from the coupling element to the insulating housing, the coupling arrangement according to the invention may be formed so that the coupling element or one of the members thereof is provided with a projection overlapping the partition wall between the coupling element and the insulating housing.

Figure 2:
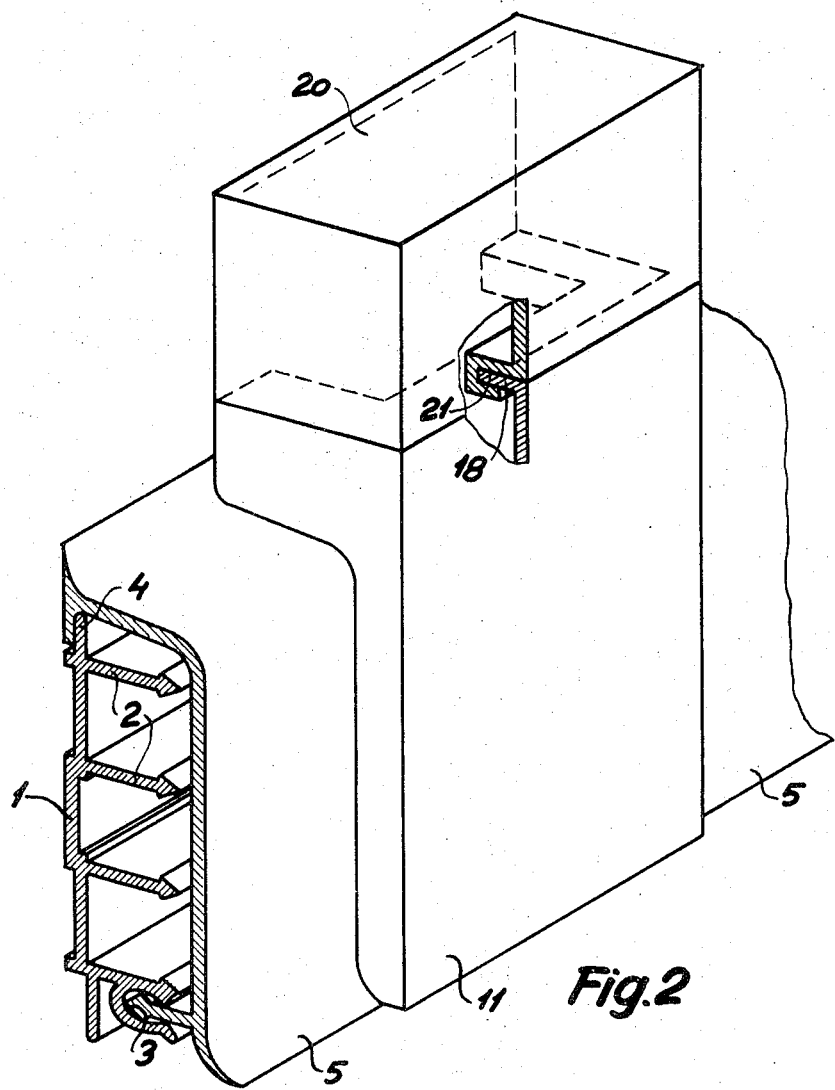
Figure 3:
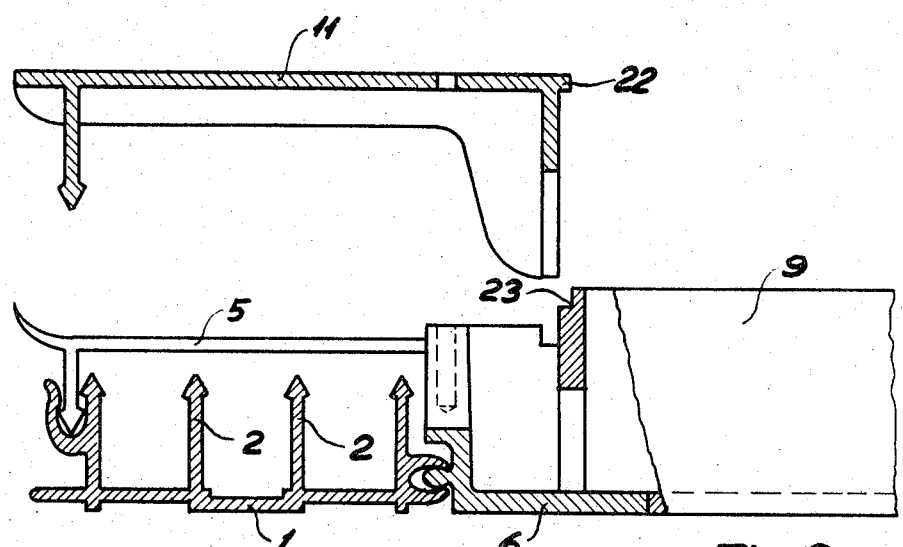

The invention will be described in greater detail below and with reference to the drawing, in which FIG. 1 shows a coupling arrangement according to the invention with the various elements partly cut away, FIG. 2 shows the corresponding arrangement provided with a cover member, and FIG. 3 is a modified embodiment of a coupling arrangement according to the invention.

FIG. 1 shows an installation panel duct 1 with a number of shelves 2 for receiving electric wires. At the bottom the panel duct is provided with a longitudinally extending groove 3 and at the top there is an upwardly directed flange 4 which together with the groove 3 is adapted for connection of a cover panel 5 in a manner known per se. The cover panel 5 is intersected at a point where it is desired to lead out wires and at this point is provided a primary coupling member 6 which by means of a groove 7 engages the flange 4 of the panel duct. The coupling member 6 has two dovetailed webs 8 by means of which it engages an insulating housing 9, which for the sake of clarity is indicated in dotted lines, but which may be a conventional insulating casing for an electric device such as a switch, socket outlet or the like and may be mounted on the wall behind by means of screws.

The primary coupling member 6 is moreover provided with an outwardly extending projection 10 having a threaded hole, and the coupling member 6 is connected to a secondary coupling member 11 comprising a cover panel 12 having edge flanges 13 abutting on the cover panel 5 and having also a knob 14 with a hole for receiving a screw 15 adapted to be screwed into the thread of the projection 10. The primary coupling member 6 is provided at one side of the projection 10 with a support flange 16 having a notch 17 for co-operation with the inwardly facing edge of the flange 18 at the upper edge of the cover panel 12 of the secondary coupling member 11. At the bottom the cover panel 12 is provided with an inwardly directed flange 19 serving to engage the groove 3 in the panel duct 1.

FIG. 2 shows the same panel duct 1 as illustrated in FIG. 1, and coupling members have been provided in the same manner as shown in FIG. 1, though only the secondary coupling member 11 is shown here, and to cover up the upper surface thereof is provided a cover member 20 with a groove 21 for co-operation with the flange 18 at the upper edge of the cover panel 12. The flange 18 extends to both sides towards the wall surface of the panel duct and thus covers up the opening in the upper section of the secondary coupling member through which wires can be led up to the electric device whose insulating housing is designated 9 and which is to be covered up when there is no electric device with the pertaining insulating housing at the said location.

The embodiment illustrated in FIG. 3 comprises the same insulating panel duct 1 with shelves 2 and cover panel 5. In a side groove in the duct 1 is inserted a primary coupling member 6, which determines the distance between the duct 1 and a separate insulating housing 9 and which is moreover used for the mounting of the secondary coupling member 11, which is provided with a nose 22 for co-operation with a rabbet on the upper edge of the insulating housing 9. This makes it impossible to insert a knife or a needle between the secondary coupling member 11 and the insulating housing 9.

The primary coupling member 6 may be rigidly connected to the insulating housing 9, for instance by gluing or by the two members being cast in one.

Instead of being secured to the primary coupling member 6 by means of a screw 15 the secondary coupling member 11 may be secured to the primary member by means of a snap catch arrangement.

What we claim is:

1. In an installation panel duct adapted to contain electric wires for power current as well as for low voltage communication, the panel duct consisting of an elongated base member and an elongated cover member adapted to be secured to said base member by means of a snap-fit connection, the arrangement of a coupling device for connection an insulating housing for an electric device such as a switch or an outlet socket to the panel duct in alignment with an opening in the cover member, said coupling device comprising a primary and a secondary coupling member, said primary coupling member having means for snap-fit connection with the base member and means for attachment to said insulating housing, the secondary coupling member consisting of a cover plate for covering said opening in the elongated cover member and being provided with means for detachable connection with the primary coupling member and means for snap-fit connection with the base member.

2. In an installation panel duct according to claim 1, said cover plate forming the secondary coupling member having edge flanges extending inwardly to abut the front of the elonged cover member and a wall member facing the insulating housing of the electric device, said wall abutting the primary coupling member and being provided with an opening for electric wires.

3. In an installation panel duct according to claim 2, wherein said means for attaching the primary coupling member to the insulating housing of the electric device consist of at least one web adapted to be engaged in the wire lead-in opening of the insulating housing.

4. In an installation panel duct according to claim 3, wherein said web or webs are dovetailed.

5. In an installation panel duct according to claim 2, wherein said opening in said wall member of the said secondary coupling member are defined by an inwardly extending edge flange adapted to co-operate with a groove in a bling cover.

6. In an installation panel duct according to claim 2, wherein said secondary coupling member are provided with a projection overlapping the partitive surface between said wall member and said insulating housing.

* * * * *